W. H. WAKFER.
MANUFACTURE OF FILES OR RASPS.
APPLICATION FILED DEC. 13, 1913.
1,109,156.
Patented Sept. 1, 1914.
2 SHEETS—SHEET 1.
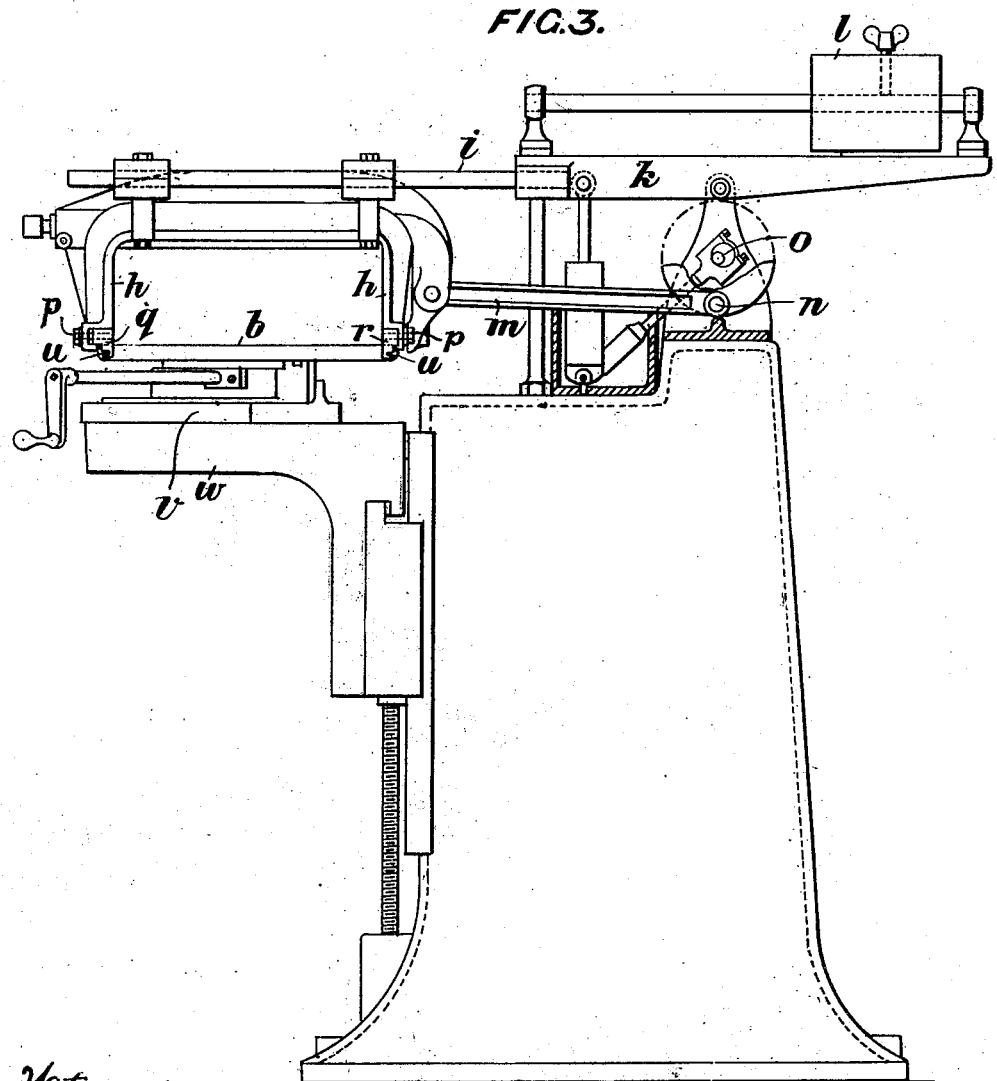

W. H. WAKFER.
MANUFACTURE OF FILES OR RASPS.
APPLICATION FILED DEC. 13, 1913.
1,109,156.
Patented Sept. 1, 1914.
2 SHEETS—SHEET 2.
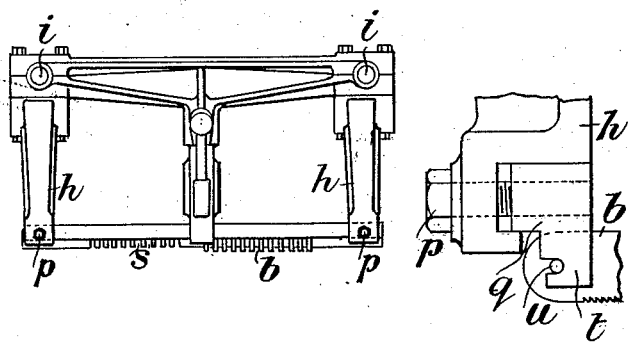
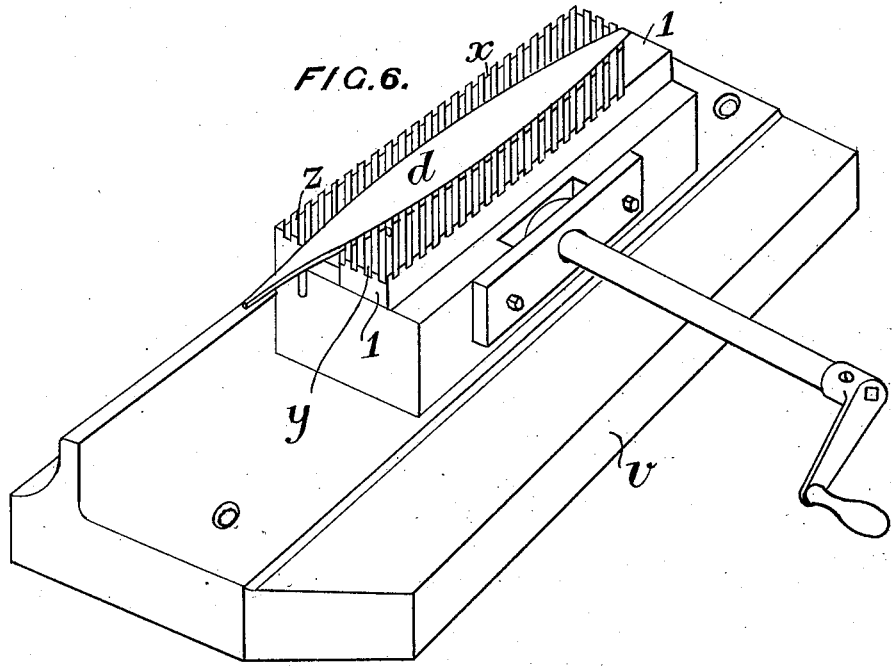

UNITED STATES PATENT OFFICE.

WILLIAM HENRY WAKFER, OF SOUTH NORWOOD, ENGLAND, ASSIGNOR OF ONE-HALF TO SAMUEL PECK, OF CALBOURNE, ENGLAND.

MANUFACTURE OF FILES OR RASPS.

1,109,156.  Specification of Letters Patent.  Patented Sept. 1, 1914.

Application filed December 13, 1913. Serial No. 806,497.

*To all whom it may concern:*

Be it known that I, WILLIAM HENRY WAKFER, a subject of the King of Great Britain, and resident of 67 Whitworth road, South Norwood, in the county of Surrey, England, have invented new and useful Improvements in the Manufacture of Files or Rasps, of which the following is a specification.

This invention has reference to improvements in the manufacture of files or very coarse files which are sometimes called rasps and particularly to files of the kind having grooves forming clearing channels for the purpose of discharging in a more or less lateral direction the filings removed from the object being filed by the teeth of the file.

It is well known that it has hitherto been proposed to cut the teeth in files by a milling cutter or similar tool or by planing, pressing, or stamping or, manually, by a chisel, either of a normal depth throughout or deeper at one end than the other but several practical difficulties were experienced when milling cutters were employed, and notably if several cutters were used together which remark also applies to the cutters or tools of planing and shaping machines, it was almost impossible, except by the expenditure of a large amount of time, to insure that all the cutters were set to cut a groove of the exact depth and, moreover, the sharpening and assembling of the cutters on the mandrel or in a tool box or multiple tool holder was a lengthy and complicated transaction, while if a single cutter broke or became blunt from various causes during the process of grooving a file blank, the operation had to be stopped some or all of the cutters had to be removed, the damaged cutter had to be resharpened and several of the cutters replaced or at least a fresh cutter had to replace the damaged cutter and the cutters or at least the new cutter had again to be set at the proper depth before the grooving operation could be re-commenced. Now all this involved firstly, an inefficient method and secondly a great expenditure of time so that from the practical point of view, it was impossible to manufacture the files on a commercially paying basis, because it is obvious that however good a file may be, there are limits as to the selling price of files, beyond which one cannot go, or the public will not buy them. The stamping or pressing of the clearing channels also had several defects because for example of the deformation or even breakage of the fibers of the metal wherever it was stamped, sometimes also the file blank required to be straightened again and furthermore a skin of oxid was formed as a result of the heating and stamping which had the effect of spoiling the cutting edges of the teeth which came to the edge of each groove, irrespective of whether the teeth were formed before or after the grooving had taken place. It has also been proposed to produce clearance grooves or channels, each groove being deeper at one end than the other or having a cross sectional area which gradually increases toward the delivery end of such groove, but according to this invention the file blanks which are or may be produced in the usual way with ground surfaces, are formed with straight grooves to serve as clearing channels or auxiliary teeth of some kinds of files by sawing. The clearing channels are made of semi-circular or more or less rectangular section with rounded corners in the process of sawing but the auxiliary teeth may be formed by saws having teeth of a cross section other than semi-circular or more or less rectangular. The saw or saws are caused to travel across the surface of the file or the file itself may be made to move in the direction of the plane or planes of the saw or saws, the same method being employed whether making the clearance channels or the teeth. The grooves or channels may be parallel and of equal depth and width throughout their length, or they may be wider or deeper or both wider and deeper at one end than the other. Or the channels may be made at an angle to each other preferably at 90° or otherwise as found convenient. The channels and the ordinary teeth are at about 45° to the longitudinal axis of the file thereby giving the correct shearing angle for either ordinary work or draw filing, but the angles of the channels and the teeth may be different, for example the teeth may be at an angle of say 45° to the longitudinal axis of the file, while the channels may for example be at 40° or even 50° thereto. Thus in coarse bastard files which are sometimes called rasps, the cutting edges of the teeth do not come exactly one behind the other but are out of alinement so that the resulting cut is smooth even though the teeth may be very coarse. It should also be understood that not only may the principal and auxiliary channels be cut by sawing but the teeth and particularly coarse teeth such as are formed on coarse bastard files or rasps may also be cut by sawing.

Figure 1 of the accompanying drawings is a cross section of a saw of the hacksaw type with teeth having rounded edges to form clearing channels semi-circular in cross section and a portion of a file blank is shown below the saw. Fig. 2 is a similar view of a saw also of the hacksaw type having teeth with only slightly rounded edges and a portion of a file blank is shown below the saw. Fig. 3 is a side elevation of a sawing machine of known construction adapted to simultaneously cut a number of parallel grooves in a file blank. Fig. 4 is an end view of the frame or holder for the saws. Fig. 5 is a detail in side elevation to a larger scale showing the method of attaching and adjusting the tension of the saw blades at one side of the frame, and Fig. 6 is a perspective view of a vise for holding a blank during the sawing process.

As shown in Fig. 1, the teeth $a$ of the saw $b$ are made semi-circular so as to produce a corresponding part-circular channel or groove $c$ in the file blank $d$. The part semicircular line $c$ represents the depth of the clearance channel at its shallow end and the dotted semi-circular line $c'$ shows the depth of the clearance channel at its deep end. Or as shown in Fig. 2, the teeth $e$ of the saw $f$ are made with rounded corners so as to produce a groove $g$ of more or less rectangular section with rounded corners. In any case the teeth of the saw or saws is or are of such an external contour as to produce channels without sharp corners, for as is well known a file with a groove having sharp corners therein is liable to break at such a channel with ordinary usage after the subsequent hardening. The dotted line $g'$ represents the depth of the clearance channel at the deep end.

Referring to Figs. 3, 4 and 5, the saws $b$ employed may be reciprocating saws of the blade or hacksaw type mounted in a frame $h$ and at suitable distances apart, if there be several, to produce a number of channels at one operation, or several frames may be employed. The saw frame $h$ is adapted to slide on the guide rods $i$ fixed to the rocking frame $k$ furnished with a weight $l$ which is adjustable on said frame and serves to regulate the pressure of the saws on the work during the cutting stroke. The saw frame $h$ is adapted to reciprocate on the rocking frame $k$ by means of a connecting rod or rods $m$ receiving motion from a crank pin $n$ mounted on the driving shaft $o$. The saw frame is provided on each side and it may be between each side and similarly at each end with adjusting screws $p$ each of which screws into a screw-threaded hole in an adjustable bar $q$ the said screws also passing through suitable holes in the saw frame $h$. There is also a similar adjustable bar $r$ at the back of the saw frame and both bars are slotted in a direction from front to back with a number of slots $s$ (Fig. 4) of a width adapted to take a saw blade $b$ and the said bars are moreover provided with hook-shaped projections $t$, best seen in Fig. 5, on each side of a slot adapted to receive a piece of steel wire $u$, one wire being passed through the hole at each end of each blade.

The file blank $d$ is mounted in a suitable vise $v$ which is bolted or otherwise fixed to the table $w$ of the machine. The top of the jaws of the vise may be parallel to the direction of cut of the saws or at an angle thereto. This vise has a number of grooves $x$ and $y$ cut in the fixed and movable jaws $z$ and $1$ respectively which slots correspond to the position and direction of the closest spacing of the grooves to be cut in a file blank $d$. If the grooves or channels are to be made deeper or of larger cross sectional area at one end than at the other it is obvious that the front or rear of the vise may be made higher or the vise may be packed up on one side, say behind, or it may be raised in front so that the saws cut deeper into the blank toward one side or edge of the file than the other. It should, however, be noted that neither the machine nor the vise form any part of this invention. Or the saws may be of the circular type, in which case they are mounted on a mandrel or arbor with spacing pieces or washers in between, to hold and maintain them at their proper distances apart.

The saw or saws may be arranged to operate in a plane at right angles to the plane of the work so as to produce channels with their sides at right angles to the surface of the file, or the saws may be mounted at an angle thereto, or the file blank may be so mounted relatively to the plane of the saw or saws by, for example, tilting the vise as aforesaid, with the result that the channels produced are undercut. The channels may thus be formed singly but naturally all of the channels are preferably made at one time on one side or on both sides of the file blank according as one employs one saw or a number of saws simultaneously on one side or on both sides. Obviously if the channels are made of equal depth and wider at one end than the other, more than one sawing operation for each channel may be required, or the blank or the saw or saws may be angularly shifted slightly relatively to each other to insure the desired taper forms in plan, but if the channels are both deeper and wider at one end than the other the cross section of the teeth may be such as to produce that result and as shown for example, in Fig. 1. Furthermore, if desired, a shallow intermediate channel or channels or an auxiliary tooth or auxiliary teeth may be formed in between and parallel to the principal channels, and such auxiliary teeth are preferably, but not necessarily, undercut by for example mounting the saws at an acute angle to the plane of the surface of the file, whether these grooves or channels be made previously or at the same time as the principal channels or subsequently, the object of these shallow channels or auxiliary teeth being to aid in the prevention of the file from slipping sidewise when in use. Or these auxiliary channels or teeth may be arranged somewhat angularly to the principal channels which is of assistance in affording a good grip on the work and particularly when filing cast iron. The channeled or grooved blanks are then preferably stripped in the usual way and may be cut by hand or put into a file cutting machine in which the teeth are cut parallel to each other in the surface of the blank at an angle which may be approximately equal, but opposite, to the angle at which the channels are cut. It should however be noted that the applicant has discovered that the cutting qualities of a file are considerably improved if the ordinary teeth be cut prior to the cutting of the clearance channels by sawing whether the teeth be cut by means of a chisel or file-tooth cutting machine or by sawing. If desired some of the channels may be at opposite angles to others and then the teeth between two channels may be cut at one angle or in one direction, while the teeth between other channels may be cut at an angle or direction opposite to the angle or direction of the other teeth before referred to. The ordinary teeth may be cut before the channels are made or afterward.

I claim:—

1. The method of manufacturing files, which comprises forming the cutting edges on a file by sawing kerfs across a blank at the desired angle to the longitudinal axis of the blank.

2. The method of manufacturing files, which comprises forming the cutting edges of a file by subjecting a file blank to a sawing operation and increasing the depth of the kerf from one end to the other during such sawing operation.

3. The method of manufacturing files, which comprises forming cutting edges of a file by sawing kerfs in a file blank, said kerfs increasing in width from one end to the other.

4. The method of manufacturing files, which comprises forming cutting edges of a file by sawing in a file blank kerfs increasing both in width and depth from one end to the other.

5. The method of manufacturing files, which comprises forming cutting edges of a file by subjecting a file blank to a reciprocatory sawing operation, for the purpose set forth.

WILLIAM HENRY WAKFER.

Witnesses:
R. PHILLIPS,
W. E. ROGERS.